(No Model.)  2 Sheets—Sheet 1.

F. A. HETHERINGTON.
DOUGH DIVIDING MACHINE.

No. 536,830.   Patented Apr. 2, 1895.

Witnesses:

Inventor
Frederick A. Hetherington
By Harry Cobb Kennedy
Attorney (No Model.) 2 Sheets—Sheet 2.

F. A. HETHERINGTON.
DOUGH DIVIDING MACHINE.

No. 536,830. Patented Apr. 2, 1895.

UNITED STATES PATENT OFFICE.

FREDERICK A. HETHERINGTON, OF INDIANAPOLIS, INDIANA, ASSIGNOR TO WILLIAM SCHMIDT, OF CHICAGO, ILLINOIS.

DOUGH-DIVIDING MACHINE.

SPECIFICATION forming part of Letters Patent No. 536,830, dated April 2, 1895.

Application filed May 14, 1894. Serial No. 511,270. (No model.)

*To all whom it may concern:*

Be it known that I, FREDERICK A. HETHERINGTON, a citizen of the United States, residing at Indianapolis, in the county of Marion and State of Indiana, have invented certain new and useful Improvements in Dough-Dividing Machines; and I do hereby declare the following to be a full, clear, and exact description of the invention, such as will enable others skilled in the art to which it appertains to make and use the same.

This invention relates to a novel construction in a dough dividing machine which is adapted more particularly to be operated by hand power, the object being to provide a machine of this character that can be easily manipulated, is efficient in its operation and inexpensive in construction.

The invention consists in the features of construction and combinations of parts hereinafter fully described and specifically claimed.

Figure 1:
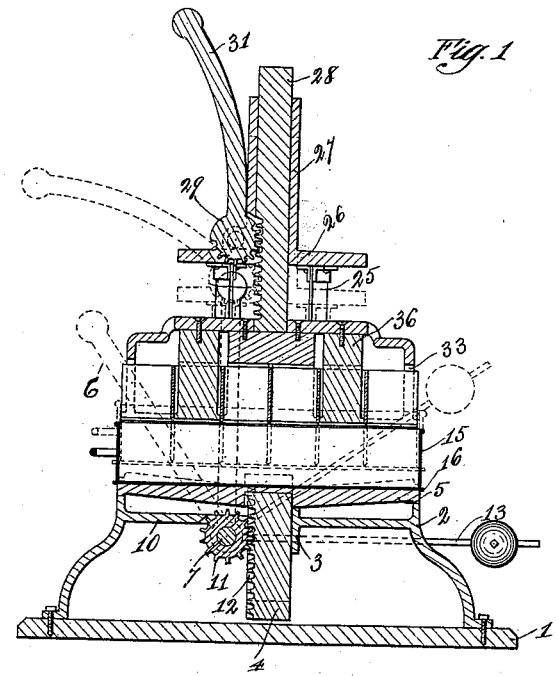
Figure 2:
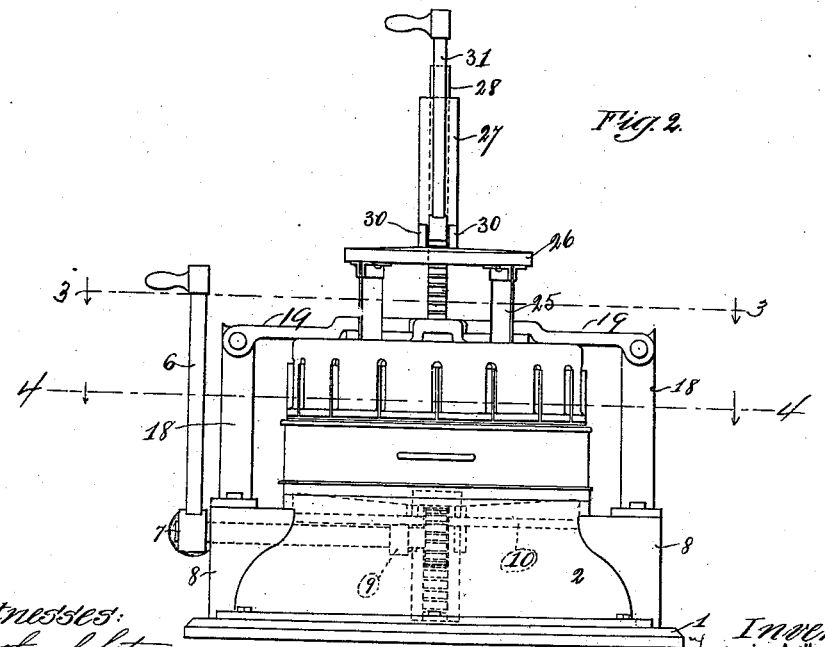
Figure 3:
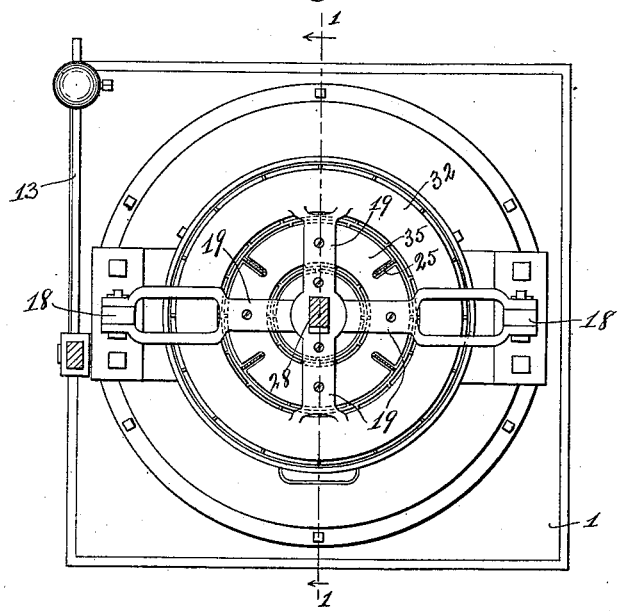
Figure 4:
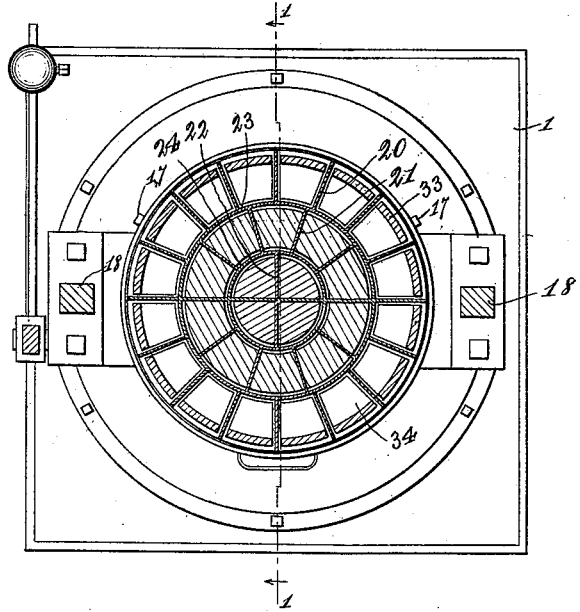

In the accompanying drawings illustrating my invention,—Figure 1 is a vertical section of a dough dividing machine constructed in accordance with my invention, said view being taken on the lines 1—1 of Figs. 3 and 4. Fig. 2 is a front elevation of the same taken from the left hand side of Fig. 1. Figs. 3 and 4 are horizontal sections taken, respectively, on the lines 3—3 and 4—4 of Fig. 2.

Referring now to said drawings, 1 indicates the base of the machine which is conveniently square, and 2 the supporting frame, conveniently circular in plan and firmly secured to said base. The said supporting frame 2 is provided about centrally with a bearing 3 for the slide 4 of a pan holding plate 5. This pan holding plate is about the size of the upper end of the supporting frame and is constructed to rest thereupon and is provided centrally on its under face with a slide or guide 4 that passes through the said bearing 3. The said slide 4 is geared to an operating handle 6, by means of which the plate 5 can be moved up and down, and in the instance illustrated the mechanism for moving said plate consists of a shaft 7 that is supported at one end in a bracket secured to the base outside of the frame 2, and at its other end in a bearing 9 upon the cross plate 10 of the supporting frame. The said shaft is provided with a gear pinion 11 that intermeshes with a rack-bar 12 on the guide 4. The outer end of the shaft is provided with the handle 6 and a counterbalanced arm 13. In this way it will be seen that by turning the handle the plate 5 will be lifted through the intermediacy of the guide above described. The dough pan 15 is adapted to set upon the plate 5 and is conveniently provided at its lower edge with a small flange 16 to be engaged by stops 17 on the plate 5, to hold the pan in position.

Opposite the bracket 8 on the other side of the supporting frame is another bracket 8, and from these two brackets rise vertical posts 18. Secured to the upper ends of these posts 18 is a frame consisting of four arms 19 two of which are fastened to said posts 18, while the other two stand at right angles thereto. The arms 19 carry the pressure blocks of the machine, which stand between the cutter frame. The cutter frame is constructed in the usual manner with the radial knives 20, 21 and 22, and the circular knives 23 and 24 joined together in any suitable manner to make the circular cutting frame that is adapted to pass within the dough pan 15 when the machine is operated. The different knives of the cutter frame pass between the pressure blocks, and this cutter frame is movable up and down by reason of the uprights 25 that are secured thereto, as shown in Figs. 1 and 3, and pass up through the upper plate of the block frame and are secured to a disk 26 having a collar 27 through which passes a rack-bar or guide 28 rigidly secured to the pressure block frame. A pinion 29 is mounted in lugs 30 on the disk 26 and intermeshes with the said rack-bar 28 and is provided with a handle 31 for turning the same. In this way it will be seen that by turning the handle 31 the disk 26 will be depressed and therefore carry with it the cutter frame, as will be obvious.

To the outer ends of two of the arms 19, that is to say, the ends that are not connected with the posts 18, is a ring 32 that is provided at intervals between the radial knives 20 with depending arms 33 that carry at their lower ends plates 34 fitting closely between the knives 20 and 23. To a ring 35 that is secured to all the arms 19 within the ring 32 are secured a plurality of blocks 36 that stand between the knives 21, 23 and 24, while between the knives 24 and 22 are located blocks that are secured at their upper ends to the arms 19. In this way it will be seen that the pressure blocks are rigid with the arms 19 which are rigid with the posts 18 fastened to the base of the machine.

The machine is operated in the following manner: The parts being in the position shown in full lines in the drawings, that is to say, with the pan holding plate 5 depressed and the cutter frame elevated, the pan 15 with dough therein is slid upon the plate 5 until it meets the stops 17 and stands directly below the pressure blocks and cutter frame. The handle 6 is then pressed down to elevate the plate 5 and dough pan to the position shown in dotted lines in Fig. 1, whereby the lower faces of the pressure blocks are brought into contact with the dough within the pan, and by pressure applied to the handle 6 the dough is pressed out. While the parts are being held in this position the handle or lever 31 is turned to the position shown in dotted lines in Fig. 1 which moves the cutter frame down into the pan and through the dough therein, as shown in dotted lines in said Fig. 1. The cake of dough is thus divided into several pieces and then the handle 31 is returned to its upright position and the handle 6 to its upright position bringing the parts to the position shown in full lines in Figs. 1 and 2, whereupon the pan 15 with its divided dough cake can be removed and another pan inserted.

I claim as my invention—

1. In a dough dividing machine, a supporting frame, a movable pan holding plate mounted upon said supporting frame, devices for elevating and depressing said pan holding plate, a plurality of pressure blocks located over said pan holding plate and rigidly secured to a stationary frame mounted upon said supporting frame, a movable cutter frame having its knives located between said pressure blocks, and devices mounted upon said stationary frame and engaging a part of said cutter frame for elevating and depressing the same, substantially as described.

2. In a dough dividing machine, a supporting frame having a bearing, a pan holding plate located upon said supporting frame and provided with a depending slide located within said bearing, a lever mounted in bearings upon the frame of the machine and geared to said slide to elevate and depress the same, a stationary frame supported upon the frame of the machine and carrying a plurality of pressure blocks and an uprising bar or post 28, a cutting frame having its knives located between said pressure blocks and joined to a collar or slide upon said bar or post 28, and devices for moving said collar, substantially as described.

3. In a dough dividing machine, a supporting frame having a bearing, a plate 5 located upon said supporting frame and having a rack-bar passing through said bearing, a shaft mounted in bearings upon the frame of the machine geared at one end to said rack-bar and provided at its other end with an operating handle, a stationary frame carrying pressure blocks and provided with an uprising rack-bar 28, a cutter frame having its knives located between said pressure blocks and connected with a collar sliding upon said rack-bar, and a gear pinion mounted upon said collar and intermeshing with said rack-bar and provided with an operating handle 31, substantially as described.

In testimony whereof I affix my signature in presence of two witnesses.

FREDERICK A. HETHERINGTON.

Witnesses:
HARRY COBB KENNEDY,
RUDOLPH WM. LOTZ.